Oct. 30, 1951 W. LASAR 2,572,938
SAW WIPER SYSTEM
Filed Aug. 26, 1947
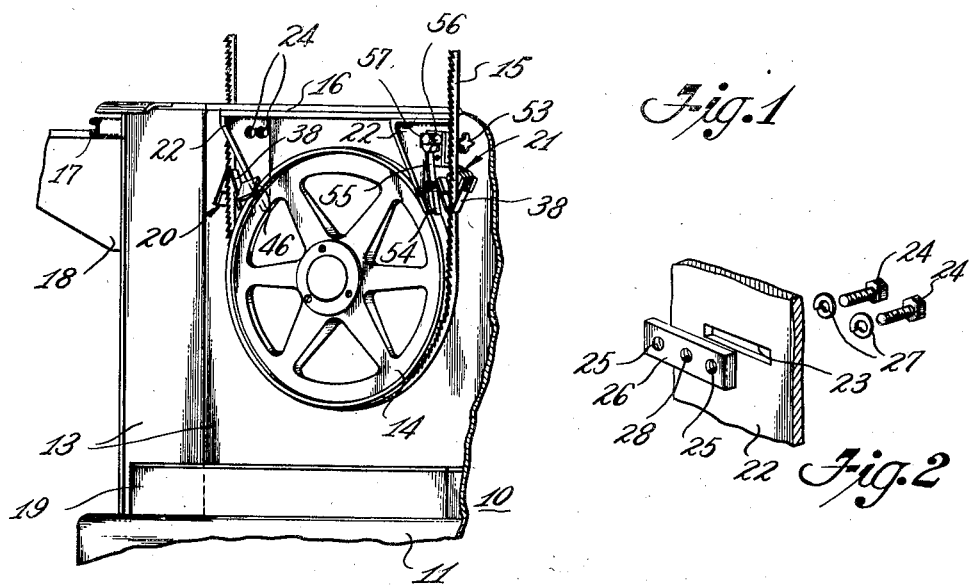
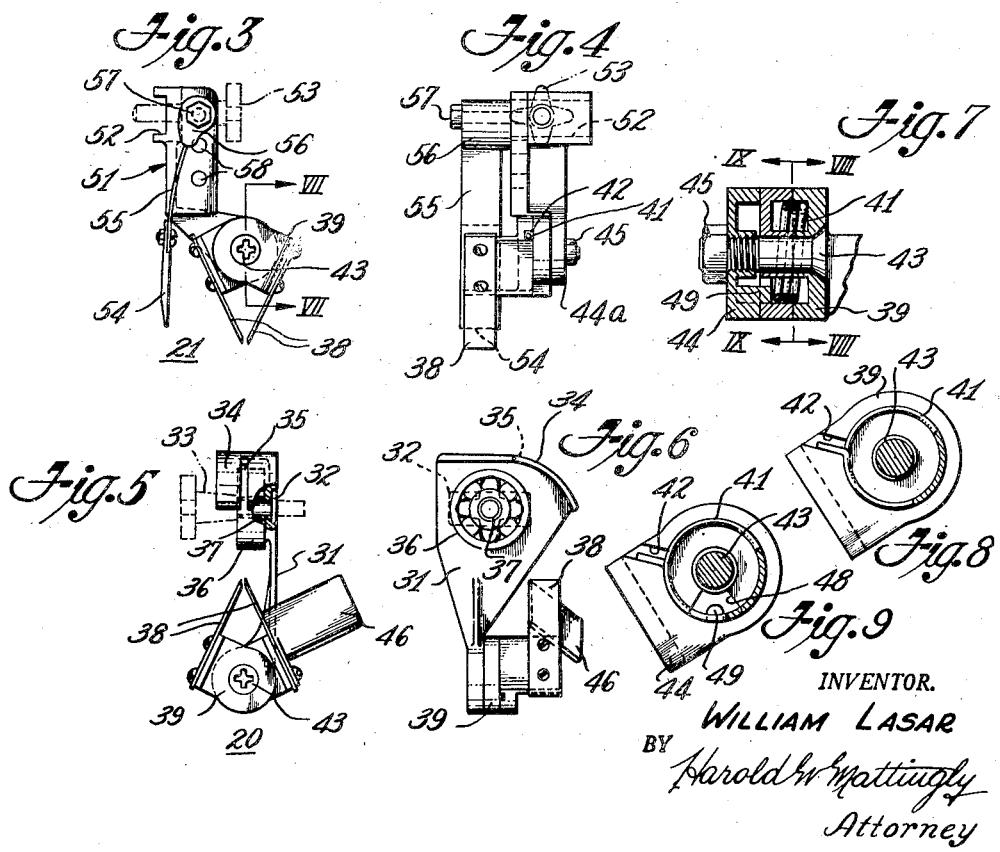
INVENTOR.
WILLIAM LASAR
BY Harold W. Mattingly
Attorney Patented Oct. 30, 1951

2,572,938

UNITED STATES PATENT OFFICE 2,572,938

SAW WIPER SYSTEM

William Lasar, Los Angeles, Calif.

Application August 26, 1947, Serial No. 770,715

6 Claims. (Cl. 143—158)

My invention relates to saw cleaning mechanisms, and has particular reference to a cleaning system for band saws employing readily detachable wiper assemblies.

Band saws that are employed in the cutting of meat and bone frequently become coated with grease or fat, and often bone dust will adhere to the endless saw blade. These adhering materials generally increase the friction between the blade and the material being cut, thus increasing power consumption. More important, however, is the reduction in friction between the blade and the driving pulley, the coating of the blade frequently resulting in slipping. Additionally, a collection of organic material on the blade introduces a sanitation problem in that coatings on the saw are difficult to remove manually.

For these and various other reasons it has been common practice to employ blade wipers on band saws used in the butchering industry and trade. While various designs and constructions have been employed, these have been objectionable due to awkwardness of installation, difficulty of removal, difficulty of cleaning, and lack of durability.

My invention provides, however, saw blade wipers for band saws that may be readily attached and readily removed by a simple manual rotation of a clamping screw. This permits rapid cleaning of the wiper inasmuch as it may be deposited bodily in a cleaning solution, thus making light work of daily sterilization and cleaning of machine parts. Additionally, the wipers embodying my invention may be automatically self-centering on the blade and may be simply constructed for the application of a uniform wiping pressure. Also my wiper construction employs deflector plates so that the scraped material may be effectively removed from the path of travel of the blade and/or a pulley about which it travels.

It is therefore a general object of my invention to provide a band saw having an improved type of wiper that may be readily removed.

Another object of my invention is to provide wiper assemblies for band saws that may be quickly attached and detached from a sawing machine.

A further object of my invention is to provide a detachable wiper assembly for band saws incorporating a saw guiding roller.

A further object of my invention is to provide an improved type of spring biasing for wiper fingers that results in uniform pressure as well as automatic self-centering of the wiper fingers.

Other objects and advantages of my invention will be apparent in the following description and claims, considered together with the accompanying drawings, in which Fig. 1 is a perspective view of the lower part of an illustrative band saw having parts broken away and provided with saw wipers made in accordance with my invention;

Fig. 2 is a perspective exploded view of an adjustable type of key that may be secured to a band saw machine to which the wiper assemblies may be readily secured and positioned;

Fig. 3 is an elevation view of the wiper assembly for the up-travel portion of the saw blade cycle, and including a pulley wiper;

Fig. 4 is a side view of the up-travel wiper of Fig. 3;

Fig. 5 is an elevation view of a saw wiper assembly for the down-travel portion of the saw blade cycle;

Fig. 6 is a side view of the down-travel wiper of Fig. 5;

Fig. 7 is an enlarged sectional view taken along the line VII—VII of Fig. 3 illustrating the spring biasing of the wiper fingers as well as the mounting of the wiper fingers to the associated removable block;

Fig. 8 is a transverse axial section along the line VIII—VIII of Fig. 7; and

Fig. 9 is an opposite-hand section from Fig. 8 along the line IX—IX of Fig. 7.

Referring to Fig. 1, a band saw 10 may include a base 11 upon which may be secured upright walls 13 forming a compartment within which may be disposed a driving pulley 14 for an endless band saw blade 15 passing around the pulley. A horizontal platform 16 provides a cutting station for the entire band saw 10, and is adapted to coact with a movable table or carriage upon which the material to be cut may be deposited. This carriage may move, for example, upon rails 17 supported by a bracket 18.

It will be appreciated by those skilled in the art that the pulley 14 may have a driving connection to a prime mover, preferably an electric motor, so that the pulley may be driven and in turn drive the endless saw blade 15 by frictional engagement. Further it will be appreciated by those skilled in the art that the cabinet formed by the side walls 13 is preferably of a sanitary construction including painted or enameled walls as well as tight corners so that cleaning solutions may be employed for washing the compartment. A pan 19 may fit within the bottom of the compartment to collect scrapings and particles from the cutting station. Additionally a door (not shown) is generally employed to cover this mechanism to exclude dirt and dust therefrom as well as to protect the user from the moving parts therein.

As previously mentioned, wiper blades embodying my invention are preferably in the form of removable assemblies including a down-travel wiper assembly 20 and an up-travel assembly 21. While these assemblies may be secured to any suitable stationary part of the saw 10, I prefer to mount them on a structural part that is readily accessible from either side so that a mounting key may be readily adjusted when secured to this part. For this reason I employ supporting brackets 22 that support the platform 16 as the mounting support for my wiper assemblies, inasmuch as access may be readily had to each side of the brackets 22.

An illustrative key mounting is shown in Fig. 2 and may be the mounting, for example, that positions the down-travel wiper assembly 20. The bracket 22 may be provided with an elongated slot 23 through which machine screws 24 may project to thread into tapped holes 25 in a key plate 26. The distance between the tapped holes 25 is preferably less than the length of the slot 23 so as to allow for some longitudinal adjustment, and if desired the transverse dimension of the slot 23 may be greater than the shank diameter of the screws 24 to provide for angular adjustment. The screws 24 may be locked in any selected position in the slot 23 by means of lock washers 27. The key plate 26 may also include a tapped hole 28 into which a thumb or hand screw may be threaded for securing to the key 26 a wiper assembly 20 or 21.

Referring now to Figs. 5 and 6, it will be noted that the down-travel wiper assembly 20 may have a mounting block 31 which may be of any suitable construction, and I have found that a die-cast is commercially preferable at present. This mounting block 31 may include a mounting face into which may be formed a rectangular recess 32 of substantially the same size as the projecting key 26 of Fig. 2. The mounting block accordingly may be placed over the key 26 and thereby become perfectly centered, and a thumb screw 33 may next pass through an aperture in the mounting block 31 to thread into the threaded hole 28 (Fig. 2) of the key plate 26. In this fashion the entire mounting block 31 is not only secured to the bracket 22, but is perfectly oriented according to the adjustment of the key plate 26 on the bracket 22.

Referring still to Figs. 5 and 6, it will be noted that the mounting block 31 may have integrally formed thereon a deflector plate 34 through which may be formed a saw blade slot 35 permitting the passage of the saw blade 15 through the deflector 34. As will be noted from an inspection of Fig. 1, the down-travel wiper assembly 20 is disposed directly beneath the cutting station, and accordingly the chunks of meat and bone may fall through the aperture in the platform 16 through which the saw blade passes. These chunks will therefore strike the deflector plate 34, to be thrown outwardly away from the saw 15 and its driving pulley 14 and fall into the collecting pan 19.

The wiper assembly 20 may additionally include a roller 36 for resisting part of the cutting pressure on the saw blade at the cutting station, and also to position the saw blade as it is being wiped. This roller is preferably in the form of a roller bearing assembly that may be mounted on a collar 37 formed integrally on the mounting block 31 and preferably forming the aperture through which the thumb screw 33 passes. Therefore the thumb screw acts not only on the collar to secure the mounting block 31, but acts also on the stationary inner race of the ball bearing to secure the roller to the mounting block 31.

The wiper portion of the assembly 20 of Figs. 5 and 6 may include a pair of wiper fingers 38 secured to apertured mounts 39. The details of construction of these mounts 39 are illustrated in Figs. 7 through 9, and it will be noted that each mount 39 may be internally apertured for the reception of a coil spring 41 and that a slot may be provided on the adjoining faces of each mount 39 as at 42 for a projecting end of the coil spring 41 so that a torque may be transmitted to the mounts. The finger mounts 39 may be secured as an assembly to the mounting block 31 by a screw 43 passing through the apertures of the mounts and threaded into an angled portion 44 of either assembly 20 or 21. The screw 43 may be locked by a nut 45, if desired. This mounting of the finger blades permits free rotation of the two fingers as a whole, and thereby permits automatic alignment without any change in wiping pressure. The angular rotation of the two wiper fingers as a unit may be limited, however, by providing an aperture 48 in one mount 39 of a suitable angular extent, into which may fit a projection 49 formed on the angular portion 44 of the appropriate mounting block. This limit of angular rotation assists in the rapid attachment of the wiper assembly 20 inasmuch as the wiper fingers are always approximately in the correct position.

As will be noted in Fig. 1, one of the wiper fingers 38 of the assembly 20 will be disposed on the side of the saw blade 15 adjacent the driving pulley 14. Thus it is imperative to remove any scrapings out of the path of travel of either the saw or the pulley. Accordingly a deflector plate 46 may be secured to the inner deflector finger 38 so as to deposit the scrapings out of the path of travel. The deflector plate may be formed of sheet metal, for example steel or stainless steel, if desired, and I prefer at present to form the wiper fingers 38 out of hard stainless steel strips. The finger mounts 39, however, may be formed of die-cast material or may be otherwise suitably constructed.

The up-travel wiper assembly 21 is illustrated in Figs. 3 and 4, and it will be noted that a mounting block 51 may be provided with a slot 52 to fit closely the key plate 26 (Fig. 2) upon which it is mounted. The attachment of the mounting block may be completed by passing a thumb screw 53 therethrough and threading it into the tapped aperture 28 in the mounting block 26. This mounting block is generally similar to the mounting block 31, and is likewise provided with a finger mounting portion 44a to which the finger mounts 39 may be secured, together with their attached fingers 38. The wiper assembly 21 differs principally from the wiper assembly 20 in that a roller is not required, and in that a pulley wiper is provided. This pulley wiper may take the form of a finger 54 which is preferably of fiber, for example fabric laminated phenolic resin condensate. This finger 54 may be suitably secured to a leaf spring 55, for example of spring steel, which in turn may be secured to a suitable mounting member 56. The mounting member 56 may have any suitable construction, but I prefer at present to form it of die-cast material that is cast about the end of the leaf spring 55. The mounting 56 may be secured to the block 51 by a screw 57 fitting in one of three tapped holes 58 according to the adjustment desired by the operator.

In employing my invention, an operator needs merely to secure the keys 26 (Fig. 2) in a suitable position, and thereafter he may apply to the projecting key 26 the appropriate wiper assembly 20 or 21. This is performed by merely fitting the recess or groove 32 or 52 of the assemblies 20 or 21, respectively, over the projecting plate 26, and thereafter rotating the thumb screw 33 or 53 for the appropriate assembly into the tapped hole 28 of the key plate. During this fastening operation, the wiping fingers 38 may be manually separated against their spring pressure so as to pass on either side of the saw blade 15. As a practical matter for the initial installation of the wiper assemblies, the adjustment of the key plates 26 with regard to their slots 23 may take place after the assembly has been secured to the key plate. This, however, occurs generally only once during the lifetime of the wiper assemblies, and may be an operation performed at the factory.

In operation, the portion of the cutter blade 15 at the cutter station will travel downwardly, and after passing through the platform 16, it will pass through the slot 35 (Fig. 5) in the chunk deflector plate 34. Accordingly any chunks of meat or bone will be immediately thrown outwardly from the saw blade to fall into the collection pan 19 (Fig. 1). The cutting pressure against the saw may be resisted in part by the roller 36 mounted on the wiper assembly 20, and this roller will also accurately position the saw with respect to the wiper fingers 38.

The wiper fingers 38 are spring urged towards each other by the torsional spring 41 (Figs. 7 to 9), and being of hard steel, they will instantly scrape loose any adhering film or grease or particles from the saw blade. The material removed by the innermost finger 38 will be deflected by the deflector plate 46 out of the path of travel of the saw, and the material will drop into the pan 19. To doubly insure the complete removal of material from the saw blade, the second removable wiper assembly 21 is provided to wipe the saw on its up-travel. This second pair of wiper fingers is supplemented by the wiper 54 for the driving pulley 14. If desired, the two wiper assemblies may be supplemented by an additional pulley wiper for the upper pulley (not shown).

While I have described my invention with respect to specific embodiments thereof, I do not limit myself to these embodiments, inasmuch as various modifications therein and equivalents thereof could be made without departing from the true spirit and scope of the invention. For example, any particular contour of mounting block could be used with any particular material of construction, and accordingly I do not limit myself to die-cast materials, or any specific material, nor to any specific shape. Likewise mountings other than the key and slot illustrated could be used for the assemblies, although at present I find this commercially preferable. Materials other than steel or stainless steel could be used for the wiper fingers, and conceivably could be of soft material such as aluminum or fiber. For these and other reasons it will be obvious that the disclosure made is clearly illustrative of my invention and not definitive or limiting.

I claim:

1. A wiper finger sub-assembly for a band saw comprising: a pair of finger mounts having slots formed on adjacent surfaces; a central aperture through the mounts; a torsion spring fitted between the mounts and about the aperture and having ends disposed in said slots; a fastener passing through the aperture to rotatably secure the mounts together; and a wiper finger secured to each mount on the opposite sides of said fastener, said fingers having convergent free end portions.

2. A band saw wiper finger sub-assembly for a detachable mounting block comprising: a pair of finger mounts having notches formed on adjacent surfaces thereof; a central aperture through the mounts; a torsion spring fitted between the mounts and having ends disposed in the notches; a screw passing through the apertures and threaded into the detachable block to hold the mounts together; and wiper fingers secured to the mounts on the opposite sides of said screw, said fingers having convergent free end portions, the torsion spring urging the fingers together so as to apply scraping pressure to a band saw blade adapted to pass between them, and the screw providing free rotation of the mounts as a whole so as to provide for automatic alignment of the fingers on the blade.

3. In a detachable wiper assembly for band saws: a mounting block; a pair of centrally apertured finger mounts having notches on adjacent surfaces thereof; a wiper finger secured to each mount on opposite sides of said aperture and having convergent free end portions; a torsion spring disposed between the mounts and having ends disposed in the notches to urge the wiper fingers together; a screw passing through the aperture of the mounts and threaded into the block; and a rotation-limiting mechanism for the finger mounts comprising a central aperture in one of the mounts into which a mounting block projection is disposed.

4. A detachable wiper assembly for band saws comprising: a mounting block adapted to be secured below the cutting station of a band saw adjacent the down-travel side of the blade thereof, said block having a key aligning surface for fixing the position of said block on the frame of said saw; a shouldered hand bolt adapted to secure said block to said frame; a roller rotatably mounted on said bolt and secured to said block by said shoulder, said roller being positioned for peripheral engagement with the back edge of said saw blade; a slotted chuck deflector mounted on said block and through which said blade passes, said deflector overhanging said roller and extending arcuately downward beyond the forward edge of said blade; a pair of finger mounts having coaxial bores therethrough and having notches formed on the adjacent surfaces thereof; a helical torsion spring fitted between said mounts with the opposite ends disposed in said notches; a pivot shaft passing through said bores and said spring and engaging said block below said roller and parallel to the plane of said blade, to support said mounts for free rotation thereon and hold said mounts to said block displaced laterally from the back edge of said blade; a pair of wiper fingers secured to said mounts on opposite sides of said shaft, said fingers having free end portions extending convergently to each other and opposed to the direction of travel of said blade, said finger ends being urged together by said spring to apply balanced scraping pressure to said blade passing therebetween, and to automatically compensate for the end wear of said fingers, said balanced scraping pressure being maintained upon the misalignment of said blade by the free rotation of said mounts, and said fingers being rotatably separable against the urging of said spring to provide for removal and engagement on said blade; and a rotation-limiting mechanism for said finger mounts comprising an enlarged recess in one of the mounts into which a mounting block projection is disposed for limited movement, said recess and said projection being angularly positioned to orient said mounts approximately to the rotational position in which said fingers are convergent about said blade, whereby to facilitate the engagement of said fingers on said blade.

5. A detachable wiper assembly for band saws comprising: a mounting block adapted to be secured below the cutting station of a band saw; quick-connect fastener means for securing said block to said frame; a pair of finger mounts having coaxial bores therethrough and having notches formed on the adjacent surfaces thereof; a helical torsion spring fitted between said mounts with the opposite ends disposed in said notches; a pivot shaft passing through said bores and said spring to support said mounts for free rotation thereon and engaging said block to hold said mounts thereto, the axis of said shaft being parallel to the blade of said saw and said mounts being displaced laterally from the back edge of said saw; a pair of wiper fingers secured to said mounts on opposite sides of said shaft, said fingers having free end portions extending convergently to each other and opposed to the direction of travel of said blade, said fingers being urged together by said spring to apply balanced scraping pressure to said blade passing therebetween, and to automatically compensate for the end wear of said fingers, said balanced scraping pressure being maintained upon the misalignment of said blade by the free rotation of said mounts, and said fingers being rotatably separable against the urging of said spring to provide for removal and engagement on said blade; and a rotation-limiting mechanism for said finger mounts comprising an enlarged recess in one of the mounts into which a mounting block projection is disposed for limited movement, said recess and said projection being angularly positioned to orient said mounts approximately to the rotational position in which said fingers are convergent about said blade, whereby to facilitate the engagement of said fingers on said blade.

6. A detachable wiper assembly for band saws comprising: a mounting block adapted to be secured below the cutting station of a band saw; a single quick-connect fastener for securing said block to said frame; a pair of finger mounts having coaxial bores therethrough and having notches formed on the adjacent surfaces thereof; a helical torsion spring fitted between said mounts with the opposite ends disposed in said notches; a pivot shaft passing through said bores and said spring to support said mounts for free rotation thereon and engaging said block to hold said mounts thereto, the axis of said shaft being parallel to the blade of said saw and said mounts being displaced laterally from the back edge of said saw; and a pair of wiper fingers secured to said mounts on opposite sides of said shaft, said fingers having free end portions extending convergently to each other and opposed to the direction of travel of said blade, said fingers being urged together by said spring to apply balanced scraping pressure to said blade passing therebetween, and to automatically compensate for the end wear of said fingers, said balanced scraping pressure being maintained upon the misalignment of said blade by the free rotation of said mounts, and said fingers being rotatably separable against the urging of said spring to provide for removal and engagement on said blade.

WILLIAM LASAR.

REFERENCES CITED

The following references are of record in the file of this patent:

UNITED STATES PATENTS

| Number | Name | Date |
|---|---|---|
| 571,876 | Hale | Nov. 24, 1896 |
| 730,419 | Tweedie | June 9, 1903 |
| 1,132,402 | Starnes | Mar. 16, 1915 |
| 1,494,774 | Davis | May 20, 1924 |
| 1,643,829 | Biro | Sept. 27, 1927 |
| 1,793,461 | Biro | Feb. 24, 1931 |
| 1,870,774 | Gaines | Aug. 9, 1932 |
| 2,059,595 | McKeage | Nov. 3, 1936 |
| 2,135,488 | Baker | Nov. 8, 1938 |
| 2,152,906 | Miller | Apr. 4, 1939 |
| 2,210,185 | Storz | Aug. 6, 1940 |
| 2,423,363 | Biro | July 1, 1947 |